United States Patent [19]
Aull et al.

[11] Patent Number: 4,848,880
[45] Date of Patent: Jul. 18, 1989

[54] SPATIAL LIGHT MODULATOR

[75] Inventors: Brian F. Aull, Cambridge; William D. Goodhue, Chelmsford, both of Mass.

[73] Assignee: Massachusetts Institute of Technology, Cambridge, Mass.

[21] Appl. No.: 120,372

[22] Filed: Nov. 13, 1987

[51] Int. Cl.[4] .......................... G02F 1/015; G02F 1/01
[52] U.S. Cl. .................... 350/355; 350/381; 350/385
[58] Field of Search ............... 350/355, 356, 374, 380, 350/381, 384, 385, 389

[56] References Cited

U.S. PATENT DOCUMENTS

| 3,551,028 | 7/1967 | Plass | 350/356 |
| 4,518,934 | 5/1985 | Venkatesan | 350/355 |
| 4,546,244 | 10/1985 | Miller | 372/12 X |
| 4,569,573 | 2/1986 | Agostinelli | 350/356 |
| 4,696,533 | 9/1987 | Kingston et al. | 350/96.14 |

OTHER PUBLICATIONS

Windhorn et al., "Monolithic GaAs/AlGaAs diode laser/deflector devices for light emission normal to the surface", Appl. Phys. Lett, 48(24), Jun. 1986, pp. 1675-1677.

Primary Examiner—Eugene R. LaRoche
Assistant Examiner—Nathan W. McCutcheon
Attorney, Agent, or Firm—Robert F. O'Connell

[57] ABSTRACT

An electro-optical device for providing spatial modulation of an incoming electromagnetic wave signal, and preferably a two-dimensional incoming signal applied orthogonally to an input plane of the device, which device includes an array of modulation regions for providing such modulation of portions of the incoming signal. An array of first reflective mirrors are positioned so as to direct the incoming electromagnetic wave signal portions through the interaction layer regions of the modulation regions in a direction substantially parallel thereto and an array of second reflective mirrors directs the modulated electromagnetic wave signal portions outwardly from the device to provide a two-dimensional spatially modulated output electromagnetic wave signal.

16 Claims, 3 Drawing Sheets

SPATIAL LIGHT MODULATOR

The Government has rights in this invention pursuant to Grant Number F19628-85-C-0002 awarded by the Air Force.

This invention relates generally to spatial light modulators and, more particularly, to semiconductor spatial light modulators using interaction regions for controlling the spatial distribution of the intensity of an electromagnetic wave transmitted therethrough.

BACKGROUND OF THE INVENTION

Devices for controlling the spatial distribution of the intensity, frequency, phase and/or polarization of electromagnetic waves, such as light, are often designated as spatial light modulators (SLM's). Such devices, which can be used in processing data, are capable of spatially modulating parallel discrete portions, or pixels, of a collimated coherent or incoherent beam of light with, for example, input data which is to be processed. The devices can be appropriately coupled to optical data processing systems, for example, into which the light beam spatially modulated with parallel input data is supplied at a rate commensurate with the processing system's potential throughput, the optical processing system utilizing parallel processing of such data without the limitations normally imposed by the need for serial manipulation of the data.

Many different forms of spatial light modulators have been suggested by those in the art. An early article, entitled "Spatial Light Modulators", by David Casasent and published in the Proceedings of the IEEE, Vol. 65, No. 1, January 1977, at pages 143–157, provides a summary of various types of spatial light modulators that have been suggested by the art. The devices described therein include SLM's using liquid crystal materials; materials which undergo surface deformation patterns (sometimes referred to as deformable SLM's), i.e., thermoplastic materials, dielectric oils, ruticon, or elastomers, or membranes combined with surface channel charged coupled devices (CCD's); alkali halide materials having intentionally introduced color center defects (sometimes referred to as photodichroic SLM's); materials which exhibit the Pockels effect (sometimes referred to as Pockels SLM's); materials using ferroelectric-photoconductor characteristics; materials using ferroelectric-photorefractive characteristics; and SLM's using acousto-optic techniques, magneto-optic techniques, techniques utilizing the characteristics of amorphous semiconductor materials; and techniques using magnetic-bubble devices. A later published article, entitled "A review of Spatial Light Modulation", by A. D. Fisher, presented at the Topical Meeting on Optical Computing, sponsored by the Optical Society of America, at Incline Village, Nev., Mar. 18–20, 1985, briefly discusses various SLM devices and the general status of the art at that time.

The devices discussed in the art can be either optically addressable or electrically addressable. Devices which are electrically addressable, such as devices which use membranes deflected by electrical signals supplied through electrodes in contact with the membrane or which use membranes combined with charged coupled devices, are relatively difficult to fabricate and the response is relatively slow so that such devices are not readily usable for high speed, real-time processing operations.

A spatial light modulator which operates in real time and which is primarily, and often preferably, electrically addressable or which may, alternatively, be optically addressable, has been disclosed in U.S. Pat. No. 4,696,533, issued on Sept. 29, 1987 to R. H. Kingston and F. Leonberger. The spatial light modulator disclosed therein is a relatively compact device handling a relatively large amount of input data in a relatively small volume, the device being capable of operation at high speeds, using up to as high as $10^9$ data samples per second. The device utilizes a suitable semiconductor substrate having a "buried channel" charge-coupled device (CCD) formed at a surface of the substrate. The amount of charge in the CCD channel material interaction regions associated with a plurality of light-transparent electrodes of a buried channel CCD is controlled by an electrical or optical data signal. In the specific embodiment disclosed therein, for example, the level of charge in such channel interaction regions thereby controls the electric field beneath the electrodes such that the light transmitted through the device is spatially modulated by the charge levels in such interaction regions in accordance with an electro-absorption effect, e.g., a Franz-Keldysch effect in a particular embodiment thereof.

Another semiconductor optical modulator has been described in the art, e.g., in the article "High-speed Optical Modulation with GaAs/AlGaAs Quantum Wells in a p-i-n Diode Structure" by T. H. Wood et al., *Applied Physics Letters,* Vol. 44, page 16, January 1984, which modulator uses a multiple quantum well (MQW) structure for producing a relatively stronger electro-absorption effect than that achievable using a Franz-Keldysch effect.

Still another device has been proposed which makes use of a structure containing a multiple quantum well (MQW) structure with a buried channel CCD fabricated on top of it. A pattern of charge packets is stored in the CCD and the magnitude of each charge packet controls the electric field across the corresponding underlying portion of the MQW structure. This in turn controls the optical transmission of that portion of the MQW structure. By applying a collimated beam of light to the pattern, one can provide for a spatial modulation of a one-dimensional or a two-dimensional input light beam. Such a device has been described, for example, in U.S. patent application, Ser. No. 050,197, filed on May 14, 1987 by B. E. Burke et al.

In such devices, the incoming light which is to be spatially modulated can be applied orthogonally to a surface, or input plane, of the device, the light passing through the device orthogonally to the interaction regions thereof (i.e., either the CCD channel material or the MQW material). The spatially modulated light thereupon exits either orthogonally from the opposite surface thereof or is reflected at such opposite surface so as to exit orthogonally therefrom at the same input plane to which the light was originally applied. The contrast that can be achieved in the modulated output light is relatively limited, however, since the modulation interaction regions thereof are relatively thin and the distance through which the incoming light travels orthogonally therein is relatively short. If such distance were longer, a greater contrast could be obtained.

A somewhat larger interaction path might be achieved merely by increasing the thickness of such interaction regions. However, when such thickness is increased, greater voltages must be used in order to achieve the required electrical field intensities. It has been found that increasing such voltages beyond a reasonable limit tends to cause a severe deterioration in the performance of the electrical addressing circuitry. Accordingly, there is a limit as to the amount by which the thickness of the interaction regions can be increased before undesirable performance degradation occurs.

In order to achieve a longer interaction path for the incoming light, it has also been proposed, for example, that the incoming light be applied to a cleaved facet and then guided through the interaction region in a direction substantially parallel, rather than orthogonal, thereto. The light then exits at the opposite facet with greater contrast for the modulated content thereof. However, it is not possible to use such latter technique for a two-dimensional array of light since the facets of the substrate can accommodate only a single line, or row, of incoming light.

It is desirable to provide a spatial light modulator which can produce greater contrast in the modulated output light while at the same time can be capable of responding to and spatially modulating a two-dimensional array of incoming light.

BRIEF SUMMARY OF THE INVENTION

In accordance with a preferred embodiment of the invention, a spatial light modulator preferably comprises a charge-coupled device (CCD) structure, each of the electrodes in the electrode array thereof being associated with a corresponding portion of a multiple quantum well (MQW) structure. Such combination structures are generally of the type discussed, for example, in the above-mentioned Burke et al. application.

A plurality of parallel grooves is formed in the device so as to provide a plurality of mesas therein, the array of CCD electrodes being positioned on the top surfaces of the mesas. A plurality of reflective surfaces, e.g., reflecting mirrors, are formed at a 45° angle downwardly from the plane of the top surfaces of the mesas. The reflective surfaces respond to a two-dimensional incoming light beam directed orthogonally with respect to the surface (i.e., the input plane) of the device at which the array of CCD electrodes is positioned. The incoming light impinging on the reflective or mirror surfaces is thereupon deflected to one end of the portion of the MQW structure which forms an interaction region associated with each electrode of the array so as to be transmitted in a direction substantially parallel through such interaction region, the electro-absorption effect thereby producing a modulation of such transmitted light. A corresponding reflective surface positioned at the opposite end of the MQW interaction region is arranged to deflect the modulated light output therefrom, for example, toward the surface (e.g., an output plane) of the device opposite to that at which the incoming light was originally received so as to exit orthogonally from such opposite surface.

Accordingly, a two-dimensional beam of incoming light can be responded to by the structure of the invention so as to produce a two-dimensional array of spatially modulated output light therefrom. Because the light being modulated travels through the interaction regions along a parallel direction therethrough, interaction occurs over a longer path than that provided in the two-dimensional array structures of the aforesaid Kingston et al. patent or Burke et al. application, in which the light travels perpendicularly through the relatively thin interaction layer regions thereof. Thus, the contrast provided in the spatially modulated light output from the structure of the invention is much greater than that provided by such prior structures when used to respond to a two-dimensional array of input light.

BRIEF DESCRIPTION OF THE INVENTION

The invention can be described in more detail with the help of the accompanying drawings wherein FIGS. 1 and 1A show a section view and a plan view, respectively, of a portion of one embodiment of the invention for providing spatial modulation along a plurality of rows of incoming light;

Figure 1:
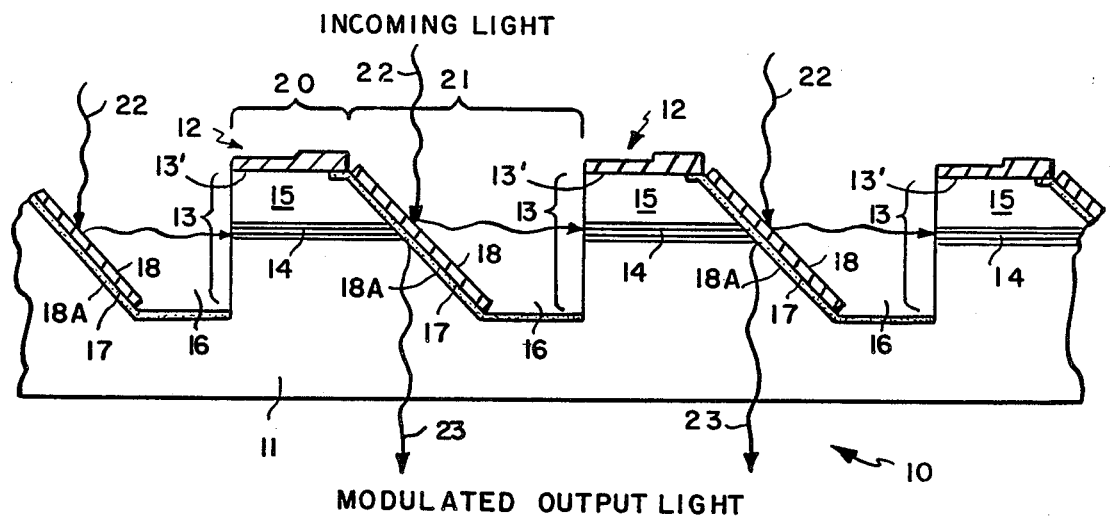

As can be seen in the enlarged view of FIG. 1, a spatial light modulator 10 comprises a semiconductor ground plane region 11, which may be of a $p^+$-AlGaAs (aluminum-gallium-arsenide) semiconductor material. A multiple quantum well (MQW) structure 14 which, for example, may comprise alternating layers of GaAs and AlGaAs materials, as would be well-known to the art, forms an interaction region, as shown. Specific MQW structures would be known to those in the art as depicted, for example, in the aforesaid Burke et al. application and need not be described in further detail here.

A plurality of grooves are formed at a surface of said device so as to provide a plurality of mesas 13.

An array of electrodes 12 are positioned on the top surfaces 13 of the mesas, each electrode being associated with a channel layer region 15 of n-AlGaAs material, which region lies above a corresponding portion of the MQW structure 14 which forms an interaction layer region. The electrodes may be formed, for example, of a film of a titanium/gold composition, as would be well-known to the art. In the particular embodiment shown, a voltage applied to an electrode 12 controls the electric field across its associated interaction region of MQW 14 and, accordingly, the MQW interaction region can, for example, modulate the intensity of light passing through the MQW interaction region in accordance with the strength of such electric field.

A reflective surface 18 is formed in device 10 by first forming rectangular grooves 16 therein and then forming surfaces 17 at a 45° angle thereto, as shown, thereby providing the plurality of mesas 13. Such grooves and 45 surfaces can be formed by using appropriate ion-beam assisted etching techniques which are well-known to the art. Further, a reflective metal layer 18 is deposited on each of the 45 surfaces 17 using well-known techniques so as to provide a reflective mirror for incoming light. The metal layer 18 is suitably insulated from the semiconductor by first forming a light transparent insulating layer 18A as would be well-known to the art. Such insulating layer may be formed of any suitable material, such as silicon dioxide ($SiO_2$), for example. Reflective mirror 18 is such that light impinging upon either side thereof will be reflected therefrom in a desired direction, as discussed in more detail below.

Figure 1A:
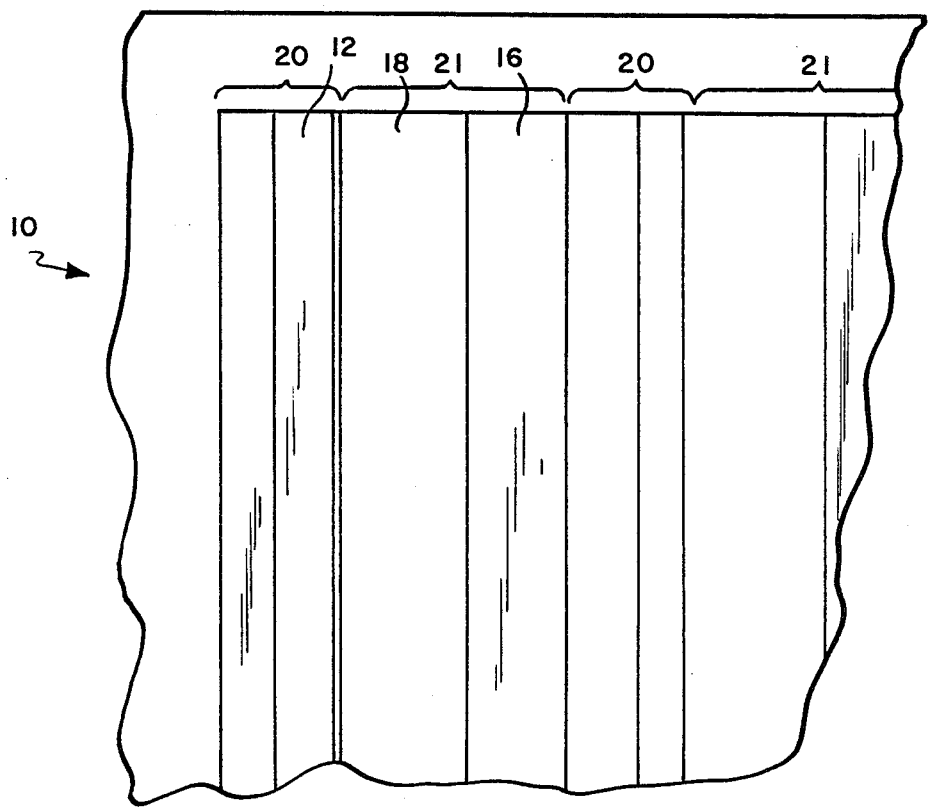

The plan view of FIG. 1A shows regions 20 and 21 of FIG. 1 and the array of electrodes 12, as well as reflective mirror structures 18 as laid out on the upper surface of device 10 in a plurality of one-dimensional rows, as depicted.

Incoming light as shown in FIG. 1 by wavy lines 22 strikes the exposed surface of reflective mirrors 18 at each of the regions 21 of the array and is deflected toward the MQW interaction layer regions 14. The deflected light travels through the MQW regions lengthwise, i.e., substantially along a direction parallel thereto, and becomes modulated thereby, the modulation intensity being controlled in accordance with the electric field produced at each MQW region by the associated channel layer regions 15. The modulated light impinges upon the opposite reflective surface of the next adjacent mirror 18 whereupon it is deflected as a modulated output light therefrom, as depicted by wavy lines 23. Because the incoming light travels lengthwise through the MQW interaction region rather than merely travelling perpendicularly therethrough, a much longer interaction path is provided for it and, acccordingly, the modulated output light has much greater contrast than that which would be present in systems in which the path of travel is perpendicular to the MQW interaction region.

In the plan view of FIG. 1A of the array, a portion of which is shown in section in FIG. 1, region 20 thereof effectively represents electrodes 12, below which are channel layer regions 15 and the corresponding interaction region portions of the MQW structure 14. Regions 21 effectively represents the region containing reflective mirrors 18 and grooves 16. As in the previously proposed structures of Kingston et al. and Burke et al., the use of such electrodes permits the overall structure to be electrically addressable for providing the desired spatial modulation characteristics of an input light beam.

Figure 2:
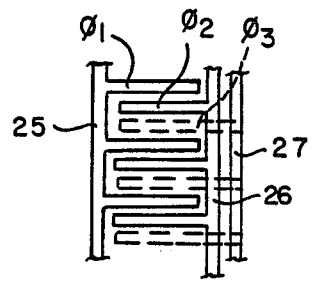
FIGS. 2 and 2A show a plan view and a section view, respectively, of a portion of an alternative embodiment of the invention for providing spatial modulation of a two-dimensional array of incoming light.

FIG. 2 shows a specific embodiment of the invention utilizing a three-phase CCD structure the electrodes of which are positioned at surfaces 29' of mesas 29 of the device, the CCD channel material regions being formed within mesa 29 below the electrodes. Thus, the three clock rails 25, 26 and 27 carry the clock voltages to the three phases (identified as $\phi_1$, $\phi_2$ and $\phi_3$), as would be well known to those in the art.

Figure 2A:
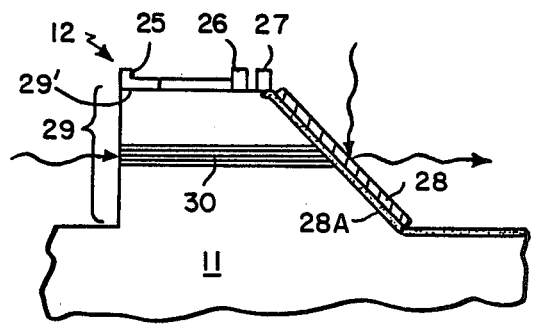

The incoming light 28 is deflected from a reflective mirror 28 toward an MQW interaction region 30 at each electrode 12/mesa 29 structure of the overall array thereof. For convenience, only a single electrode/mesa structure of the array is depicted in FIGS. 2 and 2A. Charge packets are stored in the 3-phase CCD structure and each charge packet controls the electrical field across the underlying portion of the MQW structure in a manner well known to the art as described, for example, in the aforesaid Burke et al. application.

It should be pointed out in the above figures that the relative dimensions are not to scale and generally have been enlarged in a manner so as to more clearly show the operation and relative positions of the components of the structure shown. For example, the thickness of the epitaxial layers therein is highly exaggerated and the length of the interactive region may be substantially greater in relationship to its thickness than is depicted.

Figure 3:
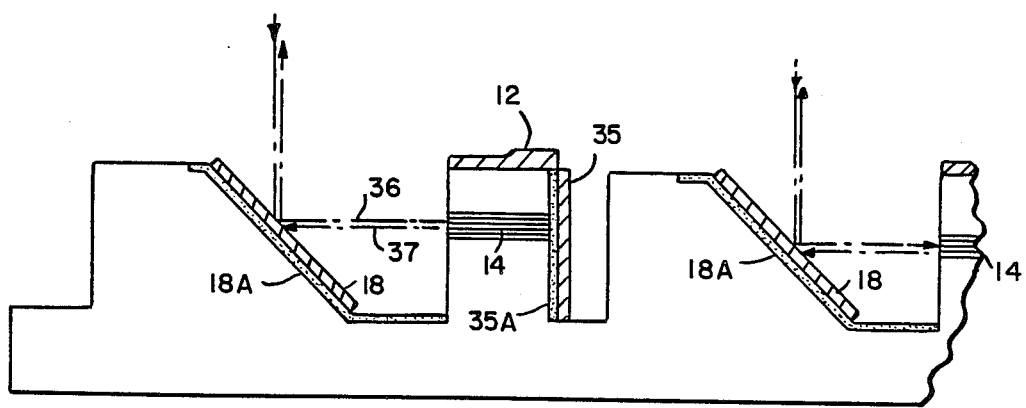
FIG. 3 shows a view in section of a portion of a still further alternative embodiment of the invention using a reflective version thereof.

Although the embodiments discussed above depict structures in which the incoming light beam is supplied orthogonally to the upper surface, or input plane, of the device 10 and is transmitted in a manner so as to produce a spatially modulated output light beam emerging orthogonally from the lower surface or output plane thereof, the structure of FIG. 3 shows how such a structure can be arranged in an alternative manner. Thus, in FIG. 3 a further reflective surface 35 is positioned so as to be orthogonal to the direction of travel 36 of the incoming light through MQW interaction region 14. The light is thereby reflected from reflective surface 35 after traversal through region 14 and travels in the reverse direction through the interaction region a second time, as depicted by arrow 37, for reflection once again at the surface of reflective mirror 18. The output light is thereby deflected in a direction substantially orthogonally to the input plane of the device so as to exit therefrom at the same input plane at which it originally enters. This reflective version of the device permits the incoming light to pass through the interaction regions twice so as to provide even further enhancement of the contrast in the modulated light therefrom.

Figure 4:
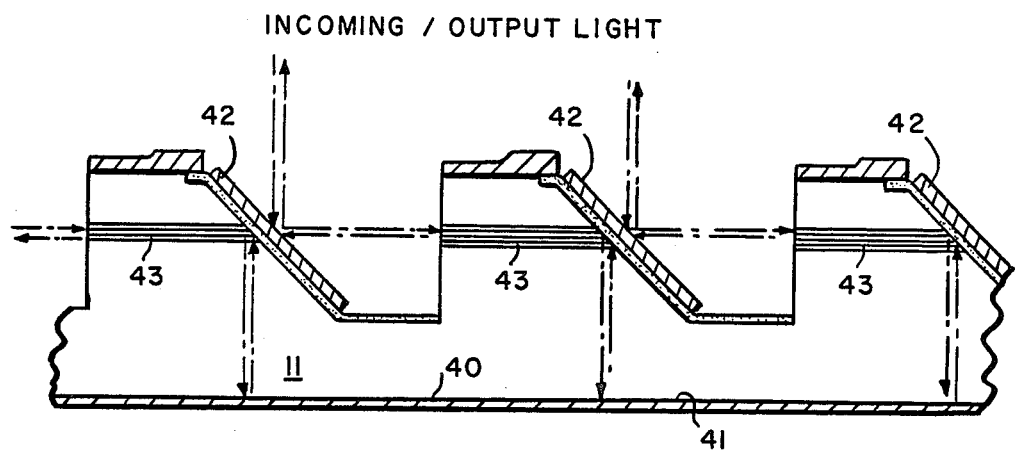
FIG. 4 shows a view in section of a portion of a still further alternative embodiment of a reflective version of the invention.

A further alternative embodiment of a reflective version of the invention is shown in FIG. 4 wherein a reflective surface 40 is formed at the bottom surface 41 of the device 10. The incoming light is reflected from one surface of a reflective element 42 through interactive region 43 and is further reflected downwardly from the opposite surface of the next adjacent reflective element 42. The modulated light is thereupon reflected upwardly from reflective surface 40 to be re-reflected from element 42 back through interactive region 43 to reflective element 42 and thence outwardly from the input plane of device 10. As before, the light passes through the interactive regions 43 twice to further enhance the contrast of the modulated output therefrom.

Figure 5:
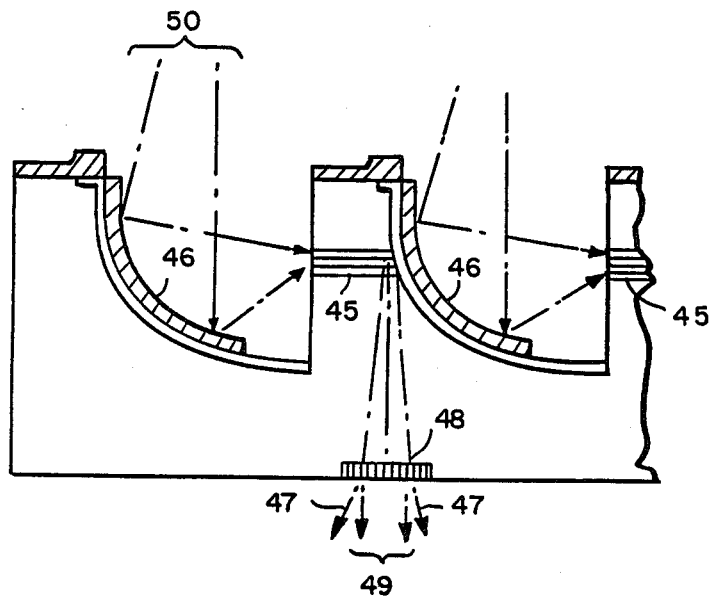
FIG. 5 shows a view in section of a portion of a still further alternative embodiment of the invention using a specifically shaped reflective surface.

The above embodiments disclose the use of substantially flat reflective surfaces. When the portions of an incoming light beam to be modulated have a larger diameter than the width of the MQW interactive layer region that is to be used for modulation, only a portion of the incoming light tends to traverse through, and become modulated by, the interactive region. However, the reflective surfaces can be suitably shaped in a curved fashion, as in an effective parabolic configuration, for example, as depicted in FIG. 5. The mirror shape can be readily fabricated using techniques known to those in the art, as by continuously varying the angle of the surface during the ion-beam assisted etching process. As can be seen therein, a portion 50 of the incoming light beam impinges upon the surface of such a concave substantially parabolic mirror 46 so as to become effectively focussed at its entry point into MQW interactive layer region 45. The modulated light which thereupon exits from region 45, impinges on the reverse convex substantially parabolic surface of the next adjacent reflective mirror 46 so as to produce a diverging beam of modulated output light, as shown. While such diverging beam may tend to further diverge as it exits from the lower surface of the device, as shown by dashed lines 47, it would be well within the skill of those in the art to form a suitable lens 48 (e.g., a Fresnel lens) at the existing surface so as to produce a non-diverging beam, i.e., so as to effectively re-collimate the diverging beam, as it exits from such lower surface, as shown by solid lines 49.

In using the structures discussed above, the interaction path length can be considerably increased, for example, by at least an order of magnitude greater than the path length in devices previously proposed for responding to a two-dimensional array of input light signals. It is believed that by so doing, when using digitally modulated input signals, an on/off contrast ratio can be increased from a range of about 2:1 to a range of about 1000:1, without increasing the voltage swing necessary to supply the modulating electric fields involved. Moreover, the technique of the invention has a further advantage in that it permits an input light beam to be polarized either in the plane of the interaction layer region of the device or perpendicular to the plane of such layer region, whereas only polarization in the plane of the interaction layer region is permitted when the light traverses such layer region orthogonally.

The above discussed embodiments of the invention depict the use thereof in contexts using MQW interaction regions having electric fields controlled by the electrode/channel layer regions of FIG. 1 or controlled by multiple-phase CCD-channel structures of FIG. 2, the MQW interaction regions in effect operating so as to guide the incoming light through the interaction region with little or no divergence during its transmission therethrough, as desired. The invention can also be adapted for use in the structures shown, for example, in the Kingston et al. patent (where no MQW structure is present) so long as suitable means, known to the art, are provided for effectively guiding the incoming light through the interaction regions which provide the modulation operation. The invention can also be adapted for use with any other structures which might be proposed in the art and which use interaction modulation layer regions in which enhancement of the contrast of the modulated signals can be achieved by directing the light to be modulated substantially within and parallel to the interaction layer region, provided the light passing through the interaction region is also suitably guided therethrough.

It should also be understood that, in addition to the intensity modulation effects discussed above, the electric fields across the interaction layer regions will produce optical phase modulation effects by virtue of the electrorefractive properties of the MQW material.

Further modifications of the invention may occur to those in the art within the spirit and scope of the invention. Hence, the invention is not to be construed as limited to the particular embodiments discussed above, except as defined by the appended claims.

What is claimed is:

1. An electro-optical device for providing spatial modulation of an incoming electro-magnetic wave signal applied thereto, said device comprising
   at least one modulation means formed in said device and including an interaction layer region for producing a modulation effect, said incoming electromagnetic signal being applied in a direction substantially orthogonal to said interaction layer region;
   an input mirror surface incorporated in the internal structure of said device substantially adjacent each of said at least one modulation means and responsive to an incoming electromagnetic wave signal for directing at least a portion of said incoming signal to said interaction layer in a direction substantially parallel to said interaction layer region so as to cause said signal portion to travel within said interaction layer region in a direction substantially parallel to said interaction layer region, said electromagnetic wave signal portion being modulated by the modulation effect at said interaction layer region; and
   an output mirror surface incorporated in the internal structure of said device substantially adjacent each of said at least one modulation means and responsive to said modulated electromagnetic wave signal portion for directing said modulated wave signal portion outwardly from said electro-optical device.

2. An electro-optical device in accordance with claim 1 wherein said at least one modulation means is an electro-absorption means for producing an electro-absorption effect and the intensities of said electromagnetic wave signal portions are modulated by the electro-absorption effects at said interaction layer region.

3. An electro-optical device in accordance claim 1 wherein said modulation means further produce electrorefractive effects and the phases of said electro-magnetic wave signal portions are phase modulated by the electrorefractive effects at said interaction layer regions.

4. An electro-optical device for providing spatial modulation of a two-dimensional incoming electromagnetic wave signal applied to said device comprising
   a two-dimensional array of modulation means formed in said device each modulation means including an interaction layer region for producing a modulation effect, said incoming electro-magnetic wave signal being appled in a direction substantially orthogonal to the interaction layer region of said array of modulation means;
   an input mirror surface incorporated in the internal structure of said device substantially adjacent each of the modulation means of said two-dimensional array thereof and responsive to said two-dimensional incoming electromagnetic wave signal for directing portions of said incoming signal to corresponding elements of said array of modulation means in directions substantially parallel to the interaction layer regions thereof so as to cause said portions of said incoming signal to travel within said interaction layer regions in a direction substantially parallel to said interaction layer regions to provide modulated portions of said incoming electromagnetic wave signal; and
   an output mirror surface incorporated in the internal structure of said device substantially adjacent each of the modulation means of said two dimensional array thereof and responsive to the modulated portions of said electromagnetic wave signal for directing said modulated portions outwardly from said electro-optical device to provide a two-dimensional spatially modulated output electromagnetic wave signal.

5. An electro-optical device in accordance with claim 4 wherein said modulation means are electro-absorption means for producing an electro-absorption effect and the intensities of said electromagnetic wave signal portions are modulated by the electro-absorption effects at said interaction layer regions.

6. An electro-optical device in accordance with claim 5 wherein said two-dimensional array of electro-absorption modulation means are formed at or near an input plane of said device and said two-dimensional incoming electromagnetic wave signal is applied in a direction substantially orthogonal to said input plane;

each of said input mirror surfaces lies substantially at a 45° angle with respect to said input plane so as to reflect said incoming signal portions in a direction which is substantially parallel to said interaction layer regions; and each of said output mirror surfaces lies substantially at a 45° angle with respect to said input plane so as to reflect said modulated portions of said incoming signal from said modulation means in an orthogonal direction outwardly from said device.

7. An electro-optical device in accordance with claim 5 wherein the electro-absorption modulation means of said two-dimensional array thereof comprises a multiple quantum well layer region which forms said interaction regions; and a charge-coupled device for producing electric fields at said multiple quantum well interaction regions, the intensities of said electric fields controlling the electro-absorption effects produced at said interaction regions so as to spatially modulate the intensity of the two-dimensional incoming electromagnetic wave signal traveling through said interaction regions.

8. An electro-optical device in accordance with claim 7 wherein said charge-coupled device is a three-phase device.

9. An electro-optical device in accordance with claim 5 wherein said two-dimensional array of electro-absorption modulation means is formed at or near an input plane of said device and said two-dimensional incoming electromagnetic wave signal is applied in a direction substantially orthogonal to said input plane;

each of said input mirror surfaces lies substantially at a 45° angle with respect to said input plane so as to reflect portions of said incoming signal in a direction which is substantially parallel to said interaction layer regions to provide modulated signals therefrom; and each of said output mirror surfaces lies substantially at a 90° angle with respect to said input plane so as to reflect the modulated signals back through said interaction layer regions toward said input mirror surfaces, said input mirror surfaces further responding to said modulated signals for reflecting said signals outwardly from said device orthogonally to said input plane.

10. An electro-optical device in accordance with claim 6 and further including additional mirror surfaces responsive to the modulated signal portions reflected from said output mirror surfaces for redirecting said signal portions back to said output mirror surfaces for reflection back through said interaction layer regions to said input mirror surfaces for reflection outwardly from said device orthogonally to said input plane.

11. An electro-optical device in accordance with claim 5 wherein said input and output mirror surfaces are substantially flat reflective surfaces.

12. An electro-optical device in accordance with claim 5 wherein said input mirror surfaces have concave substantially parabolic shapes and said output mirror surfaces have convex substantially parabolic shapes.

13. An electro-optical device in accordance with claim 12 and further including lens means positioned at the regions of said device at which said modulated electromagnetic wave signal portions are directed outwardly from said device, said lens means being responsive to said modulated signal portions from said device for providing substantially non-diverging modulated signals.

14. An electro-optical device in accordance with claim 14 wherein said lens means is a Fresnel lens means.

15. An electro-optical device in accordance with any one of claims 1, 2, 4, 5, 7, 8, 9, 10, 11, 12, 13, 14, or 15 wherein said modulation means further produce electroreflective effects and the phases of said electromagnetic wave signal portions are phase modulated by the electrorefractive effects at said interaction layer regions.

16. An electro-optical device in accordance claim 4 wherein said modulation means further produce electrorefractive effects and the phases of said electro-magnetic wave signal portions are phase modulated by the electrorefractive effects at said interaction layer regions.

* * * * *